US008839617B2

(12) United States Patent
Nelson et al.

(10) Patent No.: US 8,839,617 B2
(45) Date of Patent: Sep. 23, 2014

(54) SYSTEM AND METHOD FOR CONTROLLING CHARGING OF AN ACCUMULATOR IN AN ELECTRO-HYDRAULIC SYSTEM

(75) Inventors: Bryan Nelson, Lacon, IL (US); Jeremy Peterson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 531 days.

(21) Appl. No.: 13/250,254

(22) Filed: Sep. 30, 2011

(65) Prior Publication Data

US 2013/0081386 A1 Apr. 4, 2013

(51) Int. Cl.

| | |
|---|---|
| ***F16D 31/02*** | (2006.01) |
| ***E02F 9/22*** | (2006.01) |
| ***F15B 21/14*** | (2006.01) |
| ***F15B 1/02*** | (2006.01) |
| *F01P 7/04* | (2006.01) |

(52) U.S. Cl.

CPC ................. *F15B 1/024* (2013.01); *F01P 7/044* (2013.01); *E02F 9/2289* (2013.01); *F15B 2211/7058* (2013.01); *F15B 2211/613* (2013.01); *E02F 9/226* (2013.01); *F15B 2211/88* (2013.01); *F15B 2211/6309* (2013.01); *E02F 9/2217* (2013.01); *F15B 21/14* (2013.01); *F15B 2211/20553* (2013.01); *F15B 2211/212* (2013.01); *E02F 9/2292* (2013.01); *F15B 2211/20561* (2013.01); *E02F 9/2296* (2013.01); *F15B 2211/20569* (2013.01)

USPC ................................................ 60/418; 60/413

(58) Field of Classification Search

USPC ........................................... 60/413, 418, 456

See application file for complete search history.

(56) References Cited

U.S. PATENT DOCUMENTS

| | | | | |
|---|---|---|---|---|
| 3,915,186 | A * | 10/1975 | Thomas | 60/418 |
| 4,064,694 | A | 12/1977 | Baudoin | |
| 4,430,859 | A | 2/1984 | Hirsch | |
| 4,756,669 | A * | 7/1988 | Hata | 60/418 |
| 4,891,941 | A | 1/1990 | Heintz | |
| 6,378,301 | B2 | 4/2002 | Endo et al. | |

(Continued)

FOREIGN PATENT DOCUMENTS

WO WO2009144524 A1 12/2009

OTHER PUBLICATIONS

U.S. Appl. No. 13/114,670, filed May 24, 2011 entitled “Pump System Having Open-Loop torque Control”; Nelson et al. assigned to Caterpillar.

(Continued)

*Primary Examiner* — Michael Leslie

(57) ABSTRACT

A novel energy saving mode of charging an accumulator in an electro-hydraulic system is disclosed involving toggling the position of a fan isolation valve from the flow-passing position, where the flow is driving a fan motor thereby maintaining a fan in an on position, to the flow-blocking position where the flow is inhibited from driving the fan motor thereby causing the fan to turn off, when the time to charge an accumulator is less than the period of time that the fan may be off and still allow for the cooling requirements of the engine to be satisfied. By diverting fluid flow from driving the fan motor to charging the accumulator, the disclosed energy saving mode allows for a greater flow of fluid to be delivered to the accumulator for charging, making it possible to charge the accumulators quicker and more efficiently while maintaining the cooling requirements of the engine. The energy saving mode of operation may illustratively be used in a hystat fan and hybrid system.

20 Claims, 7 Drawing Sheets

(56) References Cited

U.S. PATENT DOCUMENTS

| | | | |
|---|---|---|---|
| 7,107,766 | B2 | 9/2006 | Zacche et al. |
| 7,240,486 | B2 | 7/2007 | Huang et al. |
| 2010/0071357 | A1 | 3/2010 | Lundberg et al. |
| 2010/0236232 | A1 | 9/2010 | Boehm et al. |
| 2011/0146261 | A1 | 6/2011 | Tevis et al. |

OTHER PUBLICATIONS

U.S. Appl. No. 13/149,161, filed May 31, 2011 entitled "Hydraulic Fluid System"; Nelson et al. assigned to Caterpillar.

U.S. Appl. No. 12/953,011, filed Nov. 23, 2010 entitled "Hydraulic Fan Circuit Having Energy Recovery"; Nelson et al. assigned to Caterpillar.

U.S. Appl. No. 13/149,326, filed May 31, 2011 entitled "Engine System with Reversible Fan"; Nelson et al. assigned to Caterpillar.

U.S. Appl. No. 13/149,430, filed May 31, 2011 entitled "Hydraulic Fan Circuit"; Nelson et al. assigned to Caterpillar.

U.S. Appl. No. 13/178,797, filed Jul. 8, 2011 entitled "Hydraulic Accumulator Fluid Charge Estimation System and Method"; Nelson et al. assigned to Caterpillar.

U.S. Appl. No. 12/957,094, filed Nov. 30, 2010 entitled "Hydraulic Fan Circuit Having Energy Recovery"; Nelson et al. assigned to Caterpillar.

U.S. Appl. No. 13/171,166, filed Jun. 28, 2011 entitled "Hydraulic Circuit Having Energy Storage and Reuse"; Nelson et al. assigned to Caterpillar.

* cited by examiner

DECOUPLED - CHARGING THRU FAN PUMP W/FAN ON

DECOUPLED - CHARGING THRU FAN PUMP W/FAN OFF

PARALLEL SYSTEM - CHARGING THRU FAN PUMP W/FAN ON

PARALLEL SYSTEM - CHARGING THRU FAN PUMP W/FAN OFF

SYSTEM AND METHOD FOR CONTROLLING CHARGING OF AN ACCUMULATOR IN AN ELECTRO-HYDRAULIC SYSTEM

TECHNICAL FIELD

The present disclosure relates generally to a system and method for controlling the charging of an accumulator, and more particularly, to controlling the charging of an accumulator in an electro-hydraulic system.

BACKGROUND

In prior art hybrid propulsion systems, an internal combustion engine is used for driving a pump. The pump pressurizes a working fluid, specifically an incompressible fluid such as hydraulic fluid. The pressurized fluid is supplied through appropriate control circuitry to a hydraulic motor, such as a swash-plate motor. The swash-plate motor can be selectively coupled to wheels, tools, a cooling system, or other power means associated with an engine-driven machine, such as bulldozers, excavators, motor graders, and other types of heavy equipment, in order to drive the wheels, tools, cooling system or other power means of the equipment.

It is known that in hybrid propulsion systems, the fuel combustion engine may be called upon to deliver more power than the engine is designed to deliver or may even be shut down in order to conserve fuel. During this time of engine power shortage or passive engine operation the main transmission pump stops pressurizing the hydraulic fluid in the transmission or hybrid transmission. However, the components within the transmission must still receive a flow of pressurized hydraulic fluid in order to maintain operability. Current hybrid systems use a motor driven pump during engine down time for this purpose of delivering a pressurized hydraulic fluid flow to these components, in order to keep these components engaged so that the transmission is ready to respond. The pump may be powered by an electric motor or accumulators.

Prior art accumulator powered systems illustrate the importance of maintaining the accumulator of a hydraulic power system at a charge of energy which is sufficient to meet the needs of the equipment and in a manner which is cost-effective and environmentally friendly.

One of the power drains in an integrated hystat fan and hybrid system is the cooling system which typically comprises one or more air-to-air and/or liquid-to-air heat exchangers that chill coolant circulated through the engine and combustion air directed into the engine. In the cooling system, heat from the coolant or combustion air is passed to air from a fan that is speed controlled based on a temperature of the engine and based on a temperature of an associated hydraulic system. Although effective at cooling the engine, it has been found that the electro-hydraulic system driving the cooling fan may have excess capacity at times that is not utilized or even wasted. With increasing focus on the environment, particularly on machine fuel consumption, it has become increasingly important to improve upon the efficiency of electro-hydraulic charging systems in order to fully utilize all resources in the integrated hystat fan and hybrid system.

One attempt to improve electro-hydraulic system charging efficiency is described in related application Ser. No. 12/957,094 of inventors Bryan Nelson et al., filed Nov. 30, 2010 and assigned to Caterpillar, in which a hydraulic fan circuit is disclosed having a primary pump, a high- and a low-pressure passage fluidly connected to the primary pump, and at least one accumulator in selective fluid communication with at least one of the high- and low-pressure passages. A fan isolation valve is movable between a flow-passing position at which the fan motor is fluidly connected to the primary pump via the high- and low-pressure passages, and flow-blocking position at which the motor is substantially isolated from the primary pump. Efficiencies in an electro-hydraulic charging system are improved by allowing the fan motor to be isolated during energy recovery operations.

The present disclosure further improves upon the efficiency of electro-hydraulic charging systems in order to more fully utilize all resources in an electro-hydraulic system.

SUMMARY OF THE INVENTION

In one exemplary aspect, the present disclosure is directed to a control system for charging an electro-hydraulic system. The electro-hydraulic system may comprise at least one sensor operatively coupled to the control system for sensing at least one parameter indicative of a charge level in an accumulator and a controller operatively coupled to the at least one sensor. The controller may be adapted to determine a time required to charge the accumulator, and to charge the system with a fan in an off position when the time required to charge the accumulator is less than a predetermined time.

In another exemplary aspect, the present disclosure is a method for charging an electro-hydraulic system. The method may include the steps of receiving a signal indicative of a charge level in an accumulator from at least one sensor operatively coupled to the electro-hydraulic system; determining a time required to charge the accumulator; and charging the electro-hydraulic system with a fan in an off position when the time required to charge the accumulator is less than a predetermined time.

DETAILED DESCRIPTION

Figure 1:
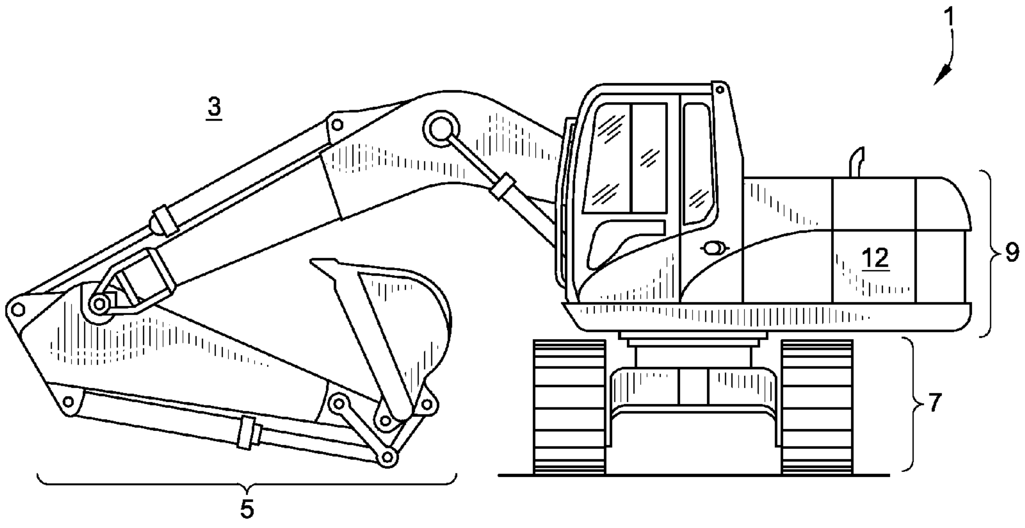
FIG. 1 is a pictorial illustration of an exemplary disclosed excavation machine.

FIG. 1 illustrates an exemplary machine 1 performing a particular function at a worksite 3. Machine 1 may embody a stationary or mobile machine, with the particular function being associated with an industry such as mining, construction, farming, transportation, power generation, oil and gas, or any other industry known in the art. For example, machine 1 may be an earth moving machine such as the excavator depicted in FIG. 1, in which the particular function includes the removal of earthen material from worksite 3 that alters the geography of worksite 3 to a desired form. Machine 1 may alternatively embody a different earth moving machine such as a motor grader or a wheel loader, or a non-earth moving machine such as a passenger vehicle, a stationary generator set, or a pumping mechanism. Machine 1 may embody any suitable operation-performing machine.

Machine 1 may be equipped with multiple systems that facilitate the operation of machine 1 at worksite 3, for example a tool system 5, a drive system 7, and an engine system 9 that provides power to tool system 5. During the performance of most tasks, power from engine system 9 may be disproportionally split between tool system 5 and drive system 7. That is, machine 1 may generally be either traveling between excavation sites and primarily supplying power to drive system 7, or parked at an excavation site and actively moving material by primarily supplying power to tool system 5. Machine 1 generally will not be traveling at high speeds and actively moving large loads of material with tool system 5 at the same time. Accordingly, engine system 9 may be sized to provide enough power to satisfy a maximum demand of either tool system 5 or of drive system 7, but not both at the same time. Although sufficient for most situations, there may be times when the total power demand from machine systems (e.g., from tool system 5 and/or drive system 7) exceeds a power supply capacity of engine system 9. Engine system 9 may be configured to recover stored energy during these times to temporarily increase its supply capacity. This additional supply capacity may also or alternatively be used to reduce a fuel consumption of engine system 9 by allowing for selective reductions in the power production of engine system 9, if desired.

Figure 2:
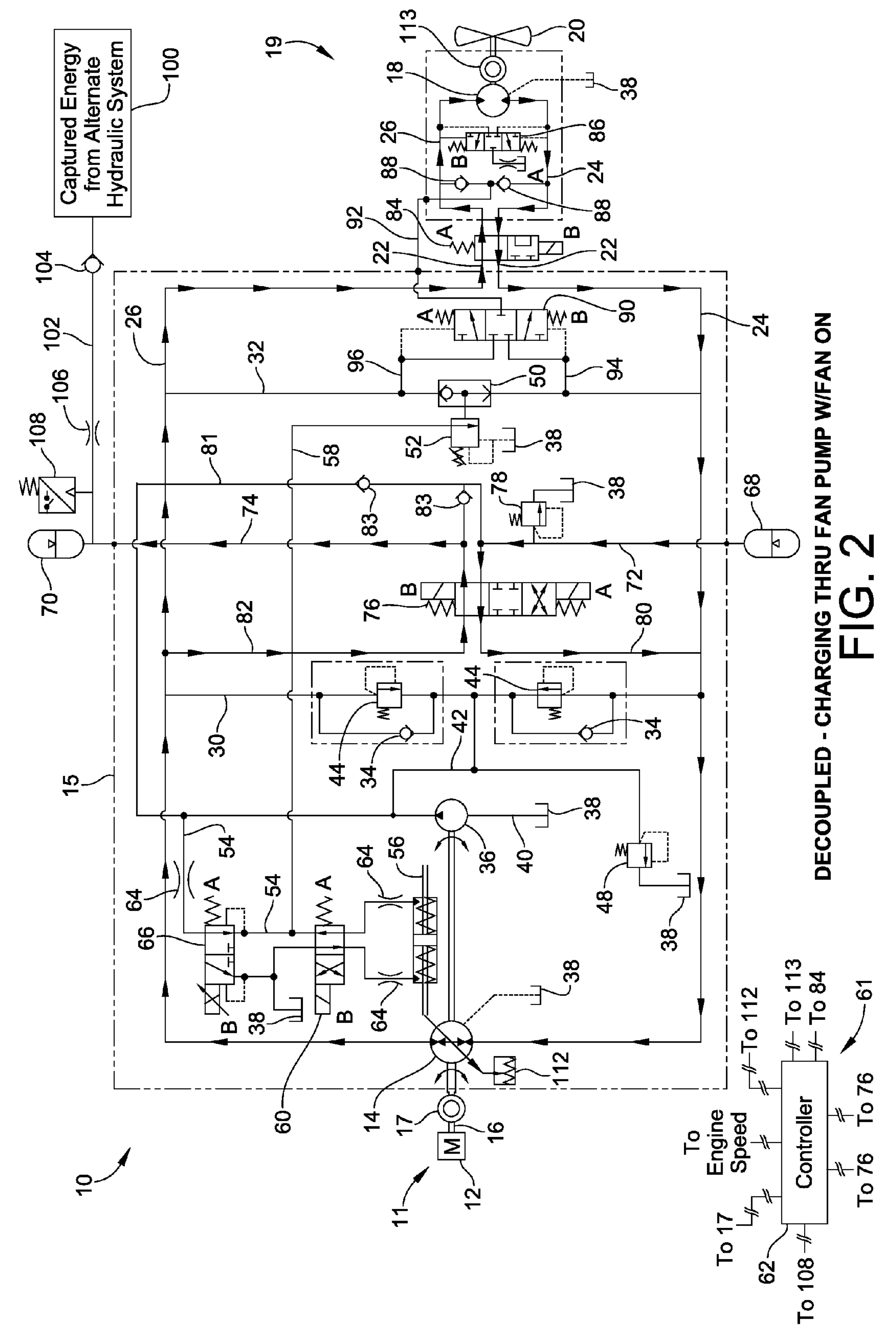
FIG. 2 is a schematic illustration of an exemplary disclosed electro-hydraulic system with a fan motor in the on position that may be utilized in connection with the excavation machine of FIG. 1.

In one exemplary aspect illustrated in FIG. 2, this disclosure is directed to a control system 61 for charging an electro-hydraulic system 10. More specifically, FIG. 2 shows a control system 61 for charging a decoupled electro-hydraulic system 10 with fan 20 in the on position. Control system 61 may have at least one sensor operatively coupled to the control system 61 for sensing at least one parameter indicative of a charge level in an accumulator such as a high pressure accumulator 70; and a controller 62 operatively coupled to the at least one sensor and adapted to: determine a time required to charge the electro-hydraulic system 10 with a fan 20 in an off position when the time required to charge the accumulator is less than a predetermined time.

Electro-hydraulic system 10 for charging of the accumulator, such as high pressure accumulator 70, through a primary pump 14 with fan 20 on includes an engine system 11 which may include an engine motor 12, for example an internal combustion engine, equipped with an electro-hydraulic charging circuit 15. Electro-hydraulic charging circuit 15 and fan motor circuit 19 may include a collection of components that are powered by engine motor 12 to cool engine motor 12 and associated machine and engine fluids. Illustratively, electro-hydraulic system 10 and fan motor circuit 19 may include a primary pump 14 connected directly to a mechanical output 16, a fan motor 18 fluidly connected to primary pump 14 by a closed-loop circuit 22 made up of a high- and low-pressure passage 26, 24; the fan 20 connected to fan motor 18; the high pressure accumulator 70 and a low pressure accumulator 68 in selective fluid communication with at least one of the high- and low-pressure passages, an accumulator charge/discharge valve 76 fluidly connected to the high- and low-pressure passages; a fan isolation valve 84, fluidly connected to the high- and low-pressure passages. Engine motor 12 may drive primary pump 14 via mechanical output 16 to draw a low-pressure fluid and discharge the fluid at an elevated pressure. Fan motor 18 may receive and convert the pressurized fluid to mechanical power that drives fan 20 to generate a flow of air. The flow of air may be used to cool engine motor 12 directly and/or indirectly by way of a heat exchanger (not shown). In the disclosed system, controller charge/discharge valve 76 is fluidly connected to the high- and low-pressure passages to control the charging of the accumulators as described below.

These and many of the components that make up the collection of components of electro-hydraulic system 10 such as engine system 11, engine motor 12, mechanical output 16, pump speed sensor 17, fan motor 18, fan 20, closed loop circuit 22, low pressure passage 24, high pressure passage 26, make-up/relief passage 30, pressure limiting passage 32, make-up check valve 34, charge pump 36, low-pressure sump 38, tank passage 40, valve passage 42, cross-over relief valve 44, charge circuit relief valve 48, discharge pressure resolver 50, pressure limiter valve 52, pilot passage 54, displacement actuator 56, passage 58, 4 way, 2 position directional valve 60, controller 62, restrictive orifice 64, normally open pressure reducing valve 66, low pressure accumulator 68, high pressure accumulator 70, low-pressure discharge passage 72, high pressure discharge passage 74, charge/discharge valve 76, low pressure accumulator relief valve 78, passage 80. fill passage 81, passage 82, fan isolation valve 84, flushing valve 86, check valve 88, motor make-up valve 90, branching passage 92, low pressure makeup passage 94, high pressure makeup passage 96, captured energy from alternate hydraulic system 100, auxiliary supply passage 102, check valve 104, restrictive orifice 106, accumulator charge level sensor 108, swashplate angle sensor 112, and fan speed sensor 113 are well known in the art as are their interconnection as shown in FIG. 2 and their operation.

The operation of charge/discharge valve 76, fan isolation valve 84 and control system 61 will now be described in greater detail as to how they accomplish the results of the disclosed electro-hydraulic system and method. Illustratively, charge/discharge valve 76 may be a double-acting, spring-biased, solenoid-controlled valve that is movable between three distinct positions based on a command from controller 62 of control system 61. In the first position (shown as the central position in FIG. 2), fluid flow through charge/discharge valve 76 may be inhibited. In the second position, fluid may be allowed to pass between low-pressure accumulator 68 and low-pressure passage 24 and between high-pressure accumulator 70 and high-pressure passage 26 (shown as position B in FIG. 2). In the third position, fluid may be allowed to pass between low-pressure accumulator 68 and high-pressure passage 26 and between high-pressure accumulator 70 and low-pressure passage 24. Charge/discharge valve 76 may be spring-biased to the first position to inhibit the flow of fluid to high-pressure accumulator 70 and then activated by controller 62 of control system 61 to allow fluid to pass to charge high-pressure accumulator 70.

Fan isolation valve 84 may be a spring-biased, solenoid-controlled valve that is movable between two distinct positions based on a command from controller 62 of control system 61. In the first position (shown as position A in FIG. 2), fluid flow from fan pump through fan isolation valve 84 may be allowed to circulate through fan motor 18. In the second position (shown as position B in FIG. 2), fluid flow from fan pump may be inhibited. When fan motor 18 is isolated by fan recirculation valve 84 (i.e., when fan isolation valve 84 is in the second position), fluid flow is blocked from passing to fan motor 18. Still, after isolation of fan isolation valve 84 from electro-hydraulic circuit 15, some fluid remaining in the fan motor line may still circulate through fan motor 18, and fan 20 may still be spinning due to inertia.

Figure 3:
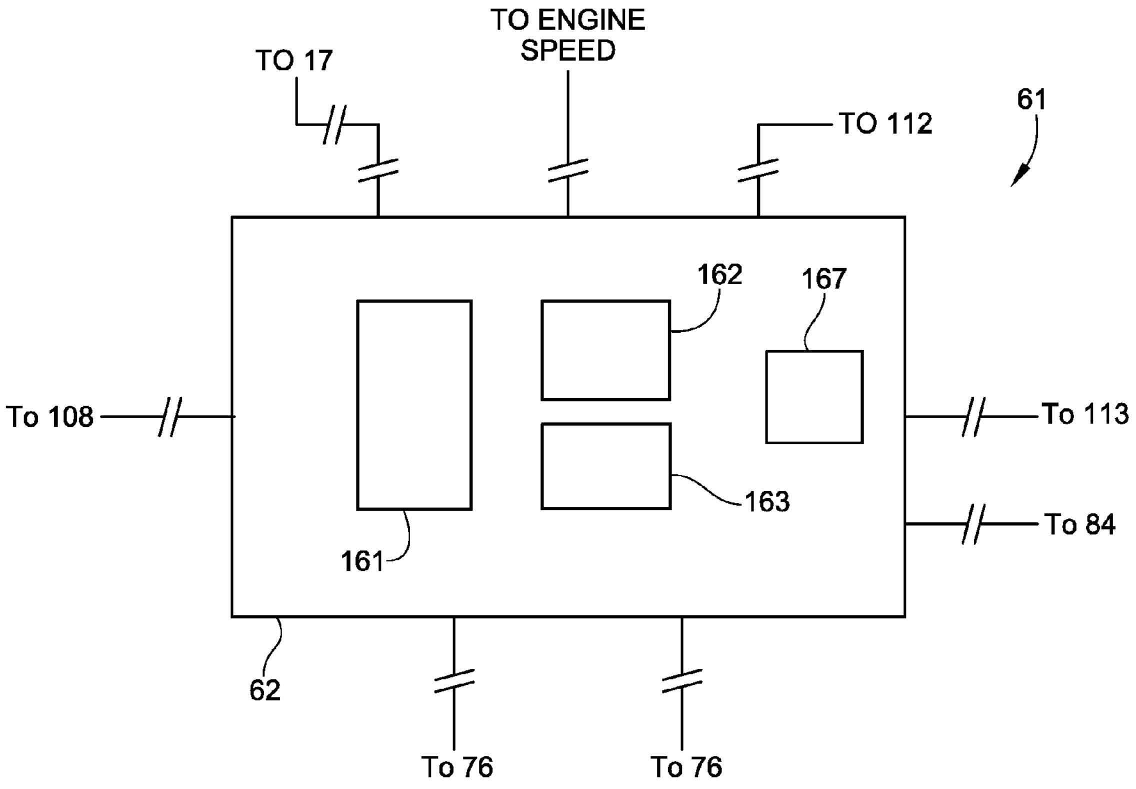
FIG. 3 is a block diagram showing functional block elements illustratively included in a control system 61.

Control system 61 may include, as shown in greater detail in FIG. 3 in functional form, a controller 62 having a processor 161, memory 162, a timer 163, and input/output 167 for controlling, as shown in FIG. 2, an operation of electro-hydraulic system 10 in response to signals received from accumulator charge level sensor 108, one or more engine sensors (not shown), a pump speed sensor 17, a pump displacement sensor 112, and a fan speed sensor 113. Processor 161 may be a single or multiple microprocessors, field programmable gate arrays (FPGAs), digital signal processors (DSPs), etc. Numerous commercially available microprocessors can be configured to perform the functions of processor 161. It should be appreciated that processor 161 could readily embody a microprocessor separate from that controlling other machine-related functions, or that processor 161 could be integral with a machine microprocessor and be capable of controlling numerous machine functions and modes of operation. If separate from the general machine microprocessor, controller 161 may communicate with the general machine microprocessor via data links or other methods. Memory 163 may be any conventional memory device, such as a semiconductor chip, or a component of a device in which instructions may be stored for execution by processor 161 to implement the process illustrated in FIG. 7. Input/output 167 may be any one or more discrete or integrated components or device that provides communication between controller 161 and electro-hydraulic system 10. Timer 165 may be software implemented for execution by processor 161 or may be a discrete or integrated components or device. Various other know circuits may be associated with controller 161, including power supply circuitry, signal-conditioning circuitry, actuator driver circuitry (i.e., circuitry powering solenoids, motors, or piezo actuators), and communication circuitry, all of which are well known in the art as are their interconnection and operation.

Control system 61 may illustratively be in communication with charge/discharge valve 76, and fan isolation valve 84 to control operations of electro-hydraulic system 10 shown in FIG. 2 during at least two distinct modes of operation based on input from accumulator charge level sensor 108, the engine speed sensor, pump speed sensor 17, swashplate angle sensor 112, and fan speed sensor 113. The modes of operation may include a normal mode of accumulator charging during which primary pump 14 drives fan motor 18 to cool engine motor 12 while charging accumulator 70, and an energy saving mode of accumulator charging during which primary pump 14 isolates fan motor 18 from electro-hydraulic circuit 15 before charging high-pressure accumulator 70 so as to allow a greater flow of fluid into the accumulator as part of the charging operation. These modes of operation will be described in more detail below to illustrate the disclosed concepts.

Figure 4:
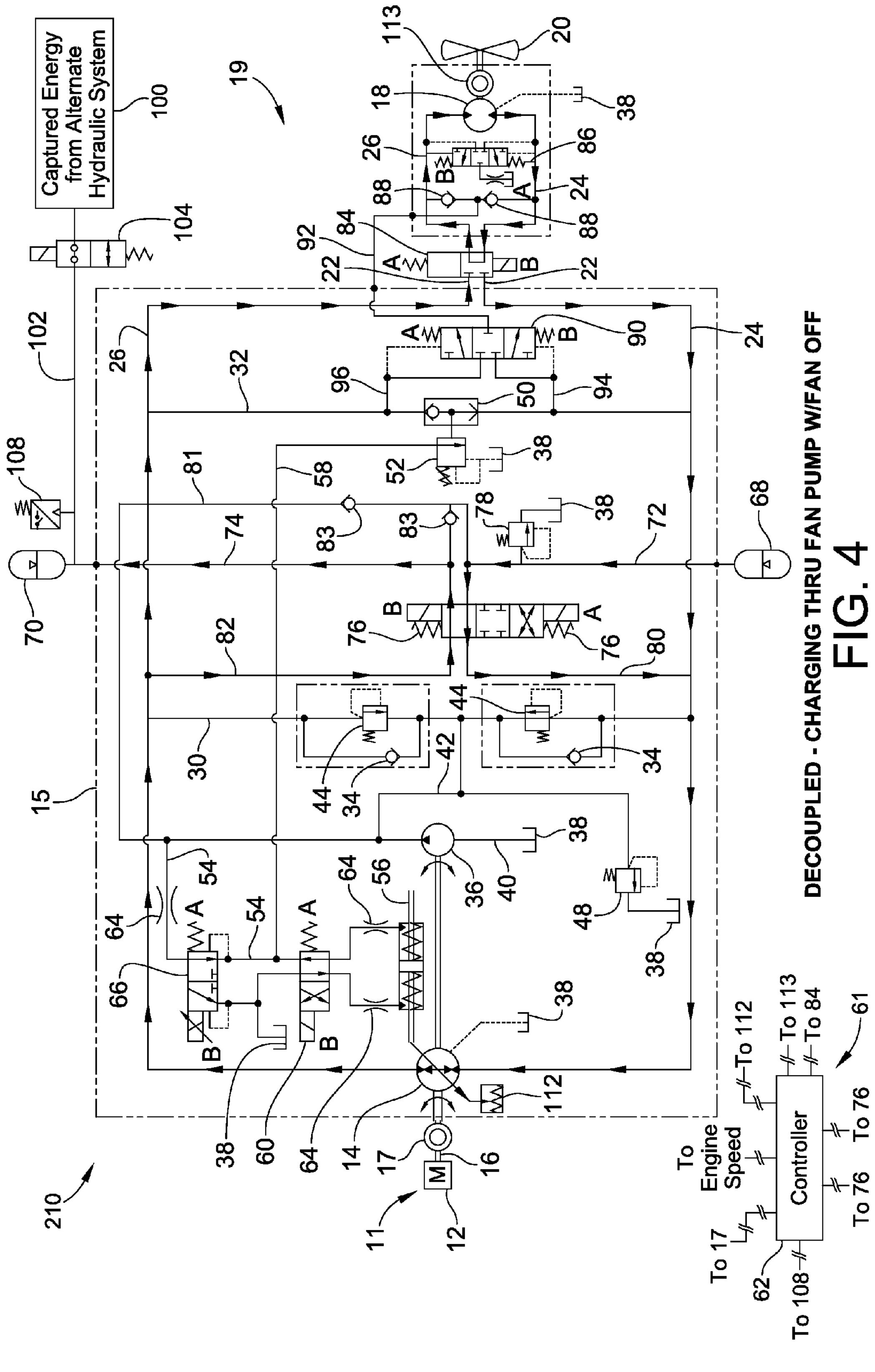
FIG. 4 is a schematic illustration of the exemplary disclosed electro-hydraulic system shown in FIG. 2 with the fan motor in the off position.

FIG. 4 shows a control system 61 for charging a decoupled electro-hydraulic system 210 with a fan 20 in the off position. Control system 61 and electro-hydraulic system 210 generally include the same components of the control system 61 and electro-hydraulic system 10 shown in FIG. 2 except configured for charging of a high pressure accumulator 70 through a primary pump 14 with fan 20 off. These components are identified with the same number as used to describe those like components in FIG. 2. The difference between FIGS. 4 and 2 lies in the position of isolation fan valve 84. In FIG. 2 isolation fan valve 84 is shown in the normal mode of charging operation. In this mode, isolation fan valve 84 is placed in the open position allowing fluid from primary pump 14 to pump through fan isolation valve 84 to drive fan motor 18 at the same time that charge/discharge valve 76, which is placed in an open position by controller 62 of control system 61, is allowing fluid to pass through charge/discharge valve 76 to charge high-pressure accumulator 70. In FIG. 4, isolation fan valve 84 is shown in an energy saving mode of charging operation of this disclosure. In this mode, isolation fan valve 84 is placed in the closed position inhibiting fluid from primary pump 14 to pump through fan isolation valve 84 to drive fan motor 18. As a result, the fluid that would normally be used to drive fan motor 18 is instead used to charge high-pressure accumulator 70. In this mode, charge/discharge valve 76, which is placed in an open position by controller 62 of control system 61, is allowing fluid to pass from primary pump 14 through charge/discharge valve 76 to charge high-pressure accumulator 70.

Figure 5:
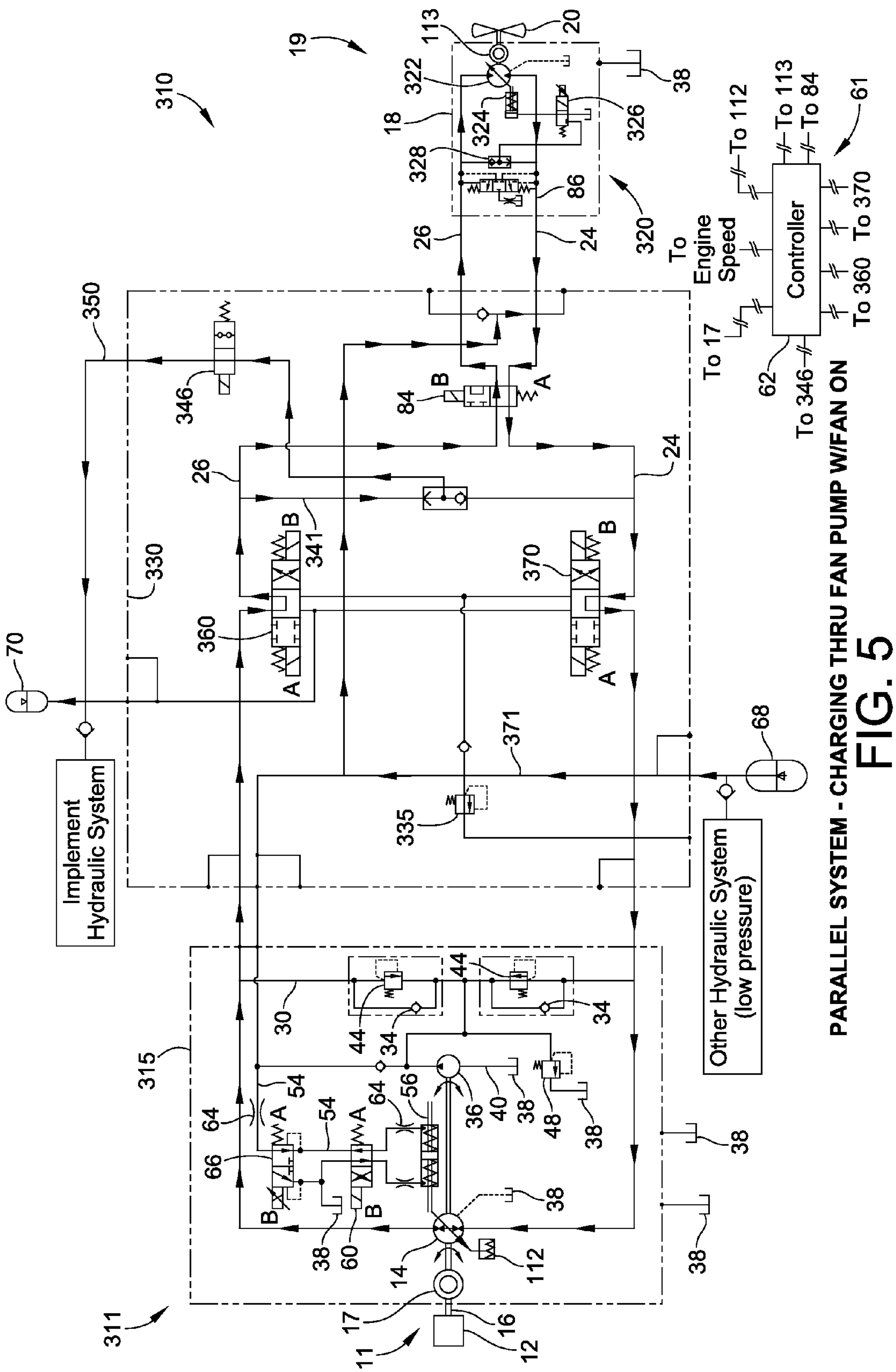
FIG. 5 is a schematic illustration of another exemplary disclosed electro-hydraulic system with a fan motor in the on position that may be utilized in connection with the excavation machine of FIG. 1.

FIG. 5 shows a control system 61 for charging a parallel electro-hydraulic system 310 illustrating charging a high pressure accumulator 70 through a fan pump system 320 with a fan 20 on. Control system 61 and electro-hydraulic system 310 includes with a number of exceptions described below many of the same elements that are contained in the control system 61 and electro-hydraulic system 10 of FIG. 2 and those elements are identified in FIG. 5 with the same number used to identify like elements in FIG. 2. The like elements include a number of the components found in pump system 320, high- and low-pressure accumulators 68, 70, and a number of the components found in fan motor system 315. Now to describe broadly some of the differences. Fan motor system 320 further includes a variable displacement fan motor 322, a displacement actuator 324 that controls displacement of fan motor 322, a displacement control valve 326 that controls movement of displacement actuator 324, and a resolver 328 that controls fluid communication between low- and high-pressure passages 26, 24 and displacement control valve 326. Resolver 328 may be movable to allow fluid from the one of low- and high-pressure passages 24, 26 having the higher pressure at a given point in time to communicate with displacement control valve 326. Displacement control valve 326 may be movable based on a command from controller 62 of control system 61 between a first position at which all fluid from resolver 328 passes to displacement actuator 324, and a second position at which some or all of the fluid from resolver 328 is blocked before it reaches displacement actuator 324. Movement of displacement control valve 326 between the first and second positions may affect a pressure of the fluid acting on displacement actuator 324 and, subsequently, movement of displacement actuator 324. Displacement actuator 324 may be a single-acting, spring-biased cylinder configured to adjust a displacement of fan motor 322 when exposed to fluid of a particular pressure. Fan motor 322, by having an adjustable displacement, may provide additional functionality during accumulator discharge not otherwise available with a fixed-displacement motor of the kind described in connection with FIG. 2. In one embodiment, fan motor 322 may be an over-center motor, if desired.

Hybrid system control manifold 330 provides fluid control to low-pressure accumulator 68 and high pressure accumulator 70. A low-pressure discharge passage 371 and a high-pressure discharge passage 341 may extend from low- and high-pressure accumulators 68, 70, respectively. High-pressure discharge passage 341 may extend to an accumulator charging valve 346. The accumulator charging valve 346 may be fluidly connected to high-pressure passage 26 by way a high pressure charge/discharge valve 360. A pressure relief valve 335 may be associated with low-pressure discharge passage 24, if desired, to selectively relieve fluid from low-pressure accumulator 68 to a low-pressure sump (not shown) and thereby maintain a desired pressure within low-pressure accumulator 68. A low pressure charge/discharge valve 370 may be associated with low pressure passage 24 to control the flow of pressured fluid in low pressure passage 24.

Discharge control valves 360, 370 may each be a double-acting, spring-biased, solenoid-controlled valve that is movable between three distinct positions based on a command from controller 62. In the first position (shown as position A in FIG. 5), fluid flow through discharge control valve 360, 370 may be inhibited. In the second position (shown as the neutral position in FIG. 5), fluid may be allowed to pass between high-pressure passage 26 and accumulator 70, in the case of discharge control valve 360, and between low-pressure accumulator 68 and low-pressure passage 24 in the case of discharge control valve 370. In the third position (shown as position B in FIG. 5), fluid in each of discharge control valves 360 and 370 may be allowed to pass between low-pressure accumulator 68 and high-pressure passage 26 and between high-pressure accumulator 70 and low-pressure passage 26.

Accumulator charging valve 346 may be associated with high pressure accumulator 70 to control the hydraulic charge received by high pressure accumulator 70 from high pressure passage 26. Accumulator charging valve 346 may be a spring-biased, solenoid-actuated control valve that is movable based on a command from controller 62. Accumulator charging valve 346 may move between a first position (shown in FIG. 5) in which fluid is allowed to flow between a passage 341 from high pressure discharge passage 26 and high-pressure accumulator 70, and a second position in which fluid flow through accumulator charging valve 346 may be inhibited. When high pressure discharge passage 341 is receiving pressurized fluid (i.e., when high pressure charge/discharge valve 360 is in the second position) and accumulator charging valve 346 is in the flow position, high pressure fluid is allowed to charge high pressure accumulator 70. When accumulator charging valve 346 is in the second position, charging of the high pressure accumulator is inhibited. These modes of operation will be described in more detail below to illustrate the disclosed concepts.

Since each of discharge control valves 360, 370 may be controlled to operate in one of three positions, the combination of discharge control valve 360 and 370 allows parallel system electro-hydraulic system 310 to be controlled to operate in 3×3 or a combined 9 combination of position settings, which in this respect provides parallel system electro-hydraulic charging system 310 with more options in setting the fluid flow in electro-hydraulic system 310 than may be possible in a coupled/decoupled electro-hydraulic system.

Figure 6:
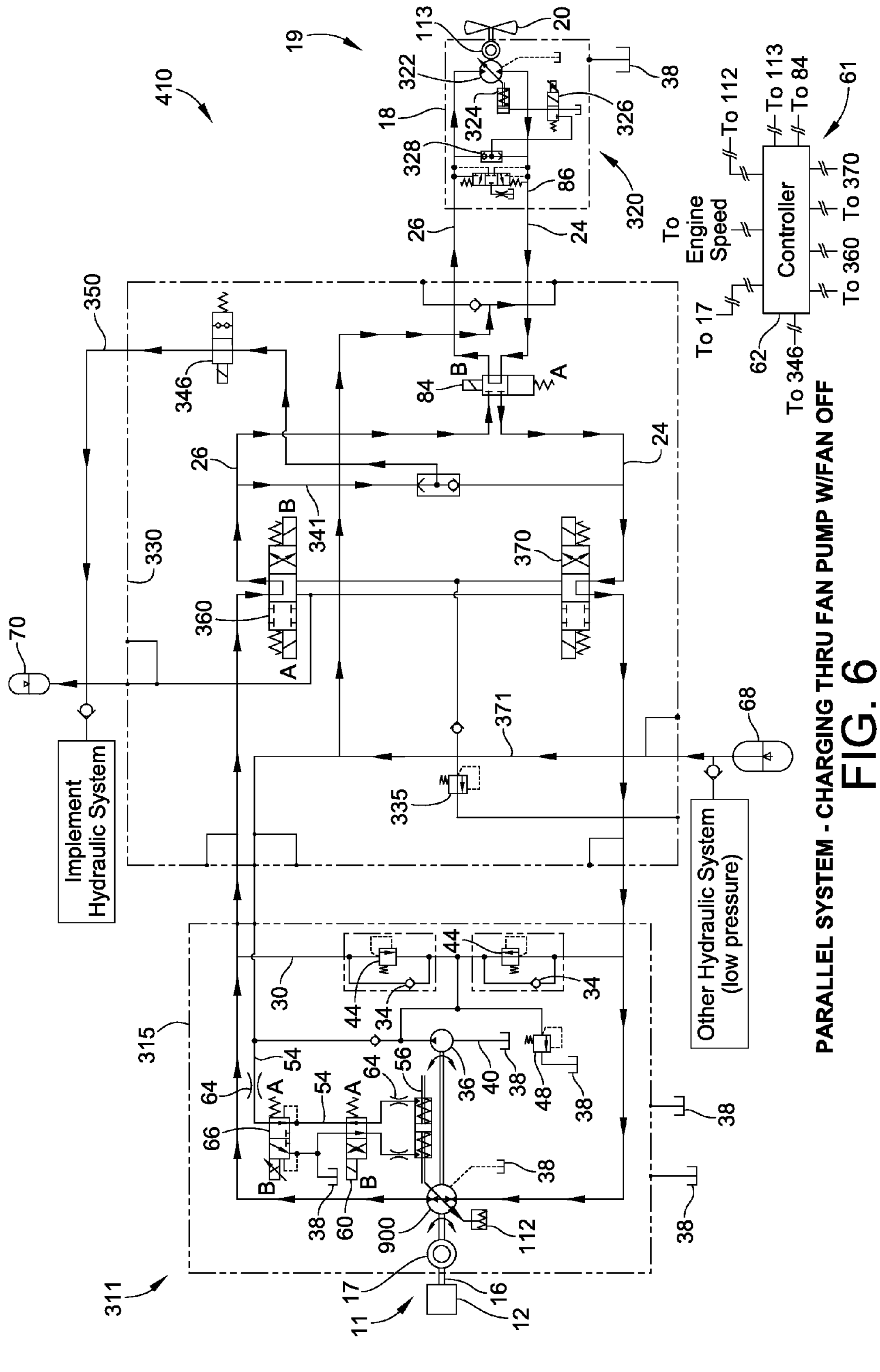
FIG. 6 is a schematic illustration of the exemplary disclosed electro-hydraulic system shown in FIG. 5 with the fan motor in the off position.

FIG. 6 shows a control system 61 for charging a parallel system electro-hydraulic system 410 with a fan 20 in the off position. Control system 61 and electro-hydraulic system 410 generally include the same components of the electro-hydraulic charging system 310 shown in FIG. 5 except configured for charging of a high pressure accumulator 70 through a primary pump 14 with fan 20 off. These components are identified with the same number as used to describe those like components in FIG. 5. The difference between FIGS. 5 and 6 lies in the position of isolation fan valve 84. In FIG. 5 isolation fan valve 84 is shown in the normal mode of charging operation. In this mode, isolation fan valve 84 is placed in the open position allowing fluid from primary pump 14 to pump through fan isolation valve 84 to drive fan motor 322 at the same time that charge/discharge valve 360, which is placed in an open position by controller 62, is allowing fluid to pass through charge/discharge valve 360 to charge high-pressure accumulator. In FIG. 6, isolation fan valve 84 is shown in the energy saving mode of charging operation. In this mode, isolation fan valve 84 is placed in the closed position inhibiting fluid from primary pump 14 to pump through fan isolation valve 84 to drive fan motor 322. As a result, the fluid that would normally be used to drive fan motor 322 is instead used to charge high-pressure accumulator 70. In this mode, charge/discharge valve 360, which is placed in an open position by controller 62, is allowing fluid to pass from primary pump 14 through charge/discharge valve 360 to charge high-pressure accumulator 70.

In the charging of an accumulator in an electro-hydraulic system disclosed, the position of the fan isolation valve is toggled from the flow-passing position, where the flow is driving a fan motor thereby maintaining a fan in an on position, to the flow-blocking position where the flow is inhibited from driving the fan motor thereby causing the fan to turn off, when the time to charge an accumulator is less than the period of time that the fan may be off and still allow for the cooling requirements of the engine to be satisfied. The period of time that the fan may be off and still allow for the cooling requirements of the engine to still be satisfied is preferably related to the period of time it takes for the fan to spin down to the point where the fan is no longer spinning and may be 3 seconds or about 3 seconds, which period of time may vary between equipment, and may also be less than or greater than the spin down period of time of the fan so long as the period of time that the fan is off still allows for the cooling requirements of the engine to be satisfied.

INDUSTRIAL APPLICABILITY

The disclosed control system 61 and electro-hydraulic system 10, 210, 310, 410 may be applicable to any heat engine where cooling and energy recovery is desired. The disclosed electro-hydraulic charging system may provide for accumulator storage and discharge operation. Operation of electro-hydraulic system 10, 210, 310, 410 will now be described.

During the normal mode of operation, engine motor 12 may drive primary pump 14 to rotate and pressurize fluid. The pressurized fluid may be discharged from primary pump 14 into high-pressure passage 26 and directed into fan motor 18, 322. As the pressurized fluid passes through fan motor 18, 322, hydraulic power in the fluid may be converted to mechanical power used to rotate fan 20. As fan 20 rotates, a flow of air may be generated that facilitates cooling of engine motor 12. Fluid exiting fan motor 18, 322, having been reduced in pressure, may be directed back to primary pump 14 via low-pressure passage 24 to repeat the cycle.

The fluid discharge direction and displacement of primary pump 14 during the normal mode of operation may be regulated based on signals from sensors accumulator charge level sensor 108, one or more engine sensors (not shown), a pump speed sensor 17, and a fan speed sensor 113, and/or other similar signal. Controller 62 of control system 61 may receive these signals and reference a corresponding accumulator charge pressure, engine speed, engine temperature, pump displacement angle, motor speed, pump speed, fan speed, or other similar parameter with one or more lookup maps stored in memory 162 to determine a desired direction and displacement setting of primary pump 14 and a corresponding rotation direction and speed of fan 20. Controller 62 may then generate appropriate commands to be sent to directional valve 60 and pressure reducing valve 66 to effect corresponding adjustments to the displacement of primary pump 14.

In conventional electro-hydraulic system, low- and/or high-pressure accumulators 68, 70 may be charged during the normal mode of operation in at least three different ways. First, for example, when primary pump 14 is driven to pressurize fluid, any excess fluid not consumed by fan motor 18, 322 may fill high-pressure accumulator 70 via charge/discharge valve 76, 360, when charge/discharge valve 76, 360 is in the flow position. Similarly, fluid exiting fan motor 18, 322 may fill low-pressure accumulator 68. Low- or high-pressure accumulators 68, 70 may only be filled while discharge control valve 76, 360 is in the flow position and pressures within low- or high-pressure passages 24, 26 are greater than pressures within low- or high-pressure accumulators 68, 70, respectively. Otherwise, low- or high-pressure accumulators 68, 70 may discharge fluid into low- or high-pressure passages 24, 26 when discharge control valve 76, 360 is moved to the open position. The movement of discharge control valve 76, 360 may be closely regulated based at least in part on the signal provided by accumulator charge level sensor 108, such that low- and high-pressure accumulators 68, 70 may be charged and discharged at the appropriate times. It should be noted that only one of low- and high-pressure accumulators 68, 70 may be filled at a time, while the other of low- and high-pressure accumulators 68, 70 will be discharging, and vice versa.

Secondly, alternatively or additionally, low- or high pressure accumulators 68, 70 may be continuously charged via charge pump 36. Specifically, at any time during normal operation, when a pressure of fluid from charge pump 36 is greater than pressures within low- or high-pressure accumulators 68, 70, fluid may be passed from charge pump 36, through fill passage 74, and past check valves 34 into the respective low- or high-pressure accumulator 68, 70. Accumulator relief valve 78 may help ensure that low-pressure accumulator 68 does not over-pressurize during charging by charge pump 36.

Thirdly, high-pressure accumulator 210 may also be charged by captured energy from alternate hydraulic system 100. That is, at any time during normal operations, when a pressure of fluid from captured energy from alternate hydraulic system 100 is greater than a pressure within high-pressure accumulator 70, fluid may be passed from captured energy from alternate hydraulic system 100, through auxiliary supply passage 102, and past check valve 104 into high-pressure accumulator 70.

In the normal mode of accumulator charging, primary pump 14 drives fan motor 28 to cool engine motor 12 while charging accumulator 70. The disclosed control system for charging electro-hydraulic system and method provides a novel energy saving mode of accumulator charging during which primary pump 14 isolates fan motor 18 from electro-hydraulic circuit 15 before charging high-pressure accumulator 70 so as to allow a greater flow of fluid into the accumulator as part of the charging operation. The disclosed control system 61 for charging electro-hydraulic system and method allows the charging operation of an accumulator to shift from the normal mode to the energy saving mode of operation on the occurrence of a specified condition as described below.

Isolation of fan motor 18, 322 occurs by setting the position of the fan isolation valve 84 to the fluid inhibit position in which case the fluid used to drive fan motor 18, 322 may be used to charge accumulator 70.

The specified condition which will cause the control system 61 for charging electro-hydraulic system 10, 210, 310, 410 to charge accumulator 70 in an energy saving mode corresponds to the period of time that the fan may be off and still allow for the cooling requirements of the engine to still be satisfied. Illustratively, this period of time is related to the period of time it takes for the fan to spin down to the point where the fan is no longer spinning. This period of time may be 3 seconds or about 3 seconds which period of time may vary between equipment. The period of time may also be less than or greater than the spin down period of time of the fan so long as the period of time that the fan is off still allows for the cooling requirements of the engine to still be satisfied.

In operation, if the time to charge the accumulator 70 is less than the period of time that the fan may be off and still allow for the cooling requirements of the engine to still be satisfied, then the position of the fan isolation valve is set by control system 61 to the flow-blocking position allowing all pump flow to be directed to charging the accumulator during the time the fan is off after which the position of the valve is returned to the flow-passing position to once again run the fan to cool the engine. If, however, the time to charge the accumulator is equal or greater than the period of time required that the fan may be off and still allow for the cooling requirements of the engine to still be satisfied, then the position of the fan isolation valve is set by control system 61 to the flow-passing position to allow pump flow through the motor to keep the fan on to cool the engine while also allowing fluid flow to charge the accumulator.

Figure 7:
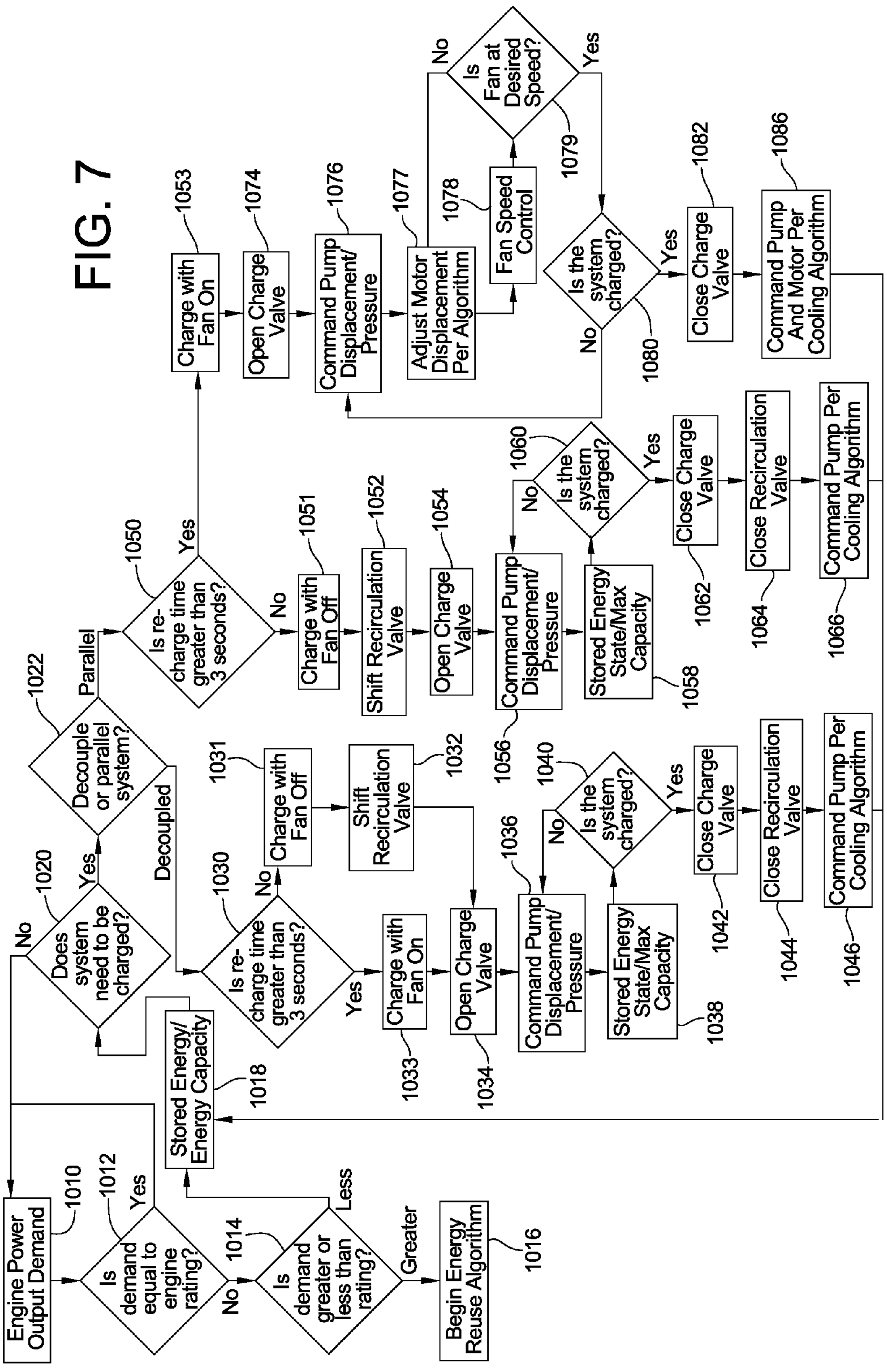
FIG. 7 is a flow diagram illustrating one embodiment of an electro-hydraulic charging process in accordance with an exemplary embodiment of the disclosed electro-hydraulic system and method.

The energy saving mode of operation disclosed in this specification may illustratively be used in a decoupled hystat fan and hybrid system. Alternatively, energy saving mode may be used in a parallel hystat fan and hybrid system or other systems in which there may be a tradeoff between accumulator charging and fan cooling requirements FIG. 7 illustrates a flow chart of an exemplary embodiment of an electro-hydraulic charging process 1000 for electro-hydraulic system 10, 210, 310, 410. As mentioned above, electro-hydraulic system 10, 210, 310, 410 may control accumulator 68, 70, based on engine power demand, the need for the system to be charged, the nature of the charging system (e.g., whether it is decoupled or a parallel system), and the recharge time of the accumulator. Thus, controlling the charge system based on these illustrative conditions allows electro-hydraulic control of the accumulator for improved machine 1 performance.

As shown in FIG. 7, at step 1010 the engine power output demand is estimated by sensors previously described. At step 1012, the engine power output demand is compared to the rating of the engine. If the engine power output demand is equal to the rating of the engine, that is to say, the answer to the equality determination is YES, then the process flow returns to step 1010 to sample another comparison of power output demand to rating of the engine. In other words, a YES determination at step 1012 indicates that all power of the engine is required to satisfy the power output demand and so the process does just that. However, if the answer to the equality determination at step 1012 is NO, then the process advances to step 1014 where the engine demand is compared to the rating of the engine to determine whether engine demand is greater or less than the rating of the engine. If the engine demand is greater than the rating of the engine, that is to say, the answer to the determination is GREATER, then the process flow advances to step 1016, where the process begins an energy reuse algorithm. In other words, a GREATER determination at step 1014 indicates that the engine is being called upon to deliver more power than the engine is designed to deliver. During this time of engine power shortage the energy reuse algorithm causes main transmission pump to stop pressurizing the hydraulic fluid in the transmission or hybrid transmission and a motor driven pump powered by the accumulator is activated to deliver the energy shortfall. If the engine demand is less than the rating of the engine, that is to say, the answer to the determination is LESS, then the process flow advances to step 1018 where the stored energy of the accumulator and the energy capacity of the accumulator are determined. At step 1020, the stored energy of the accumulator is compared to the energy capacity of the accumulator. If the stored energy of the accumulator is equal to the energy capacity of the accumulator, the answer to the determination question does the system need to be charged is NO and the system returns to step 1010 to sample another comparison of power output demand to rating of the engine. If the answer to the determination question at step 1020 is YES, then the accumulator needs to be charged and the system advances to step 1022 where the process determines whether the accumulator system is a decoupled system of the kind shown in s. 2 and 4 or a parallel system of the kind shown in FIGS. 5 and 6. If the system is a decoupled system, the answer to the question is the system decoupled or parallel system is DECOUPLED, than the accumulator advances to step 1030. If the answer is PARALLEL, than the accumulator advances to step 1050.

At step 1030, the calculated time to recharge the accumulator is compared to 3 seconds. Although 3 seconds is used in this embodiment this period of time may be about 3 seconds, or a period of time that the fan may be off and still allow for the cooling requirements of the engine to still be satisfied, or any of the other periods of time previously described. If the calculated time to recharge the accumulator is greater than 3 seconds, that is to say, the answer to the question is recharge time greater than 3 seconds is YES, then the process advances to step 1033. At step 1033, controller 350 checks to ensure that electro-hydraulic charging system is operating with the fan on and then advances to step 1034. If the fan is in the off position, step 1033 sets the isolation valve to the fluid pass position to enable the fan. At step 1034, the controller opens a charge valve to allow fluid to pass through the valve to the accumulator. If the calculated time to recharge the accumulator is less than or equal to 3 seconds, that is to say, the answer to the question is recharge time greater than 3 seconds is NO, then the process advances to step 1031. At step 1031, controller 350 sets the circulation valve to the flow-blocking position at which point the motor is fluidly disconnected from the primary pump and the high- and low-pressure passages so that a greater flow may be delivered to the accumulator for charging. This makes it possible to charge the accumulators quicker and more efficiently while maintaining the cooling requirements of the engine. After the controller sets the circulation valve to the flow-blocking position, the process advances to step 1034 where the controller opens a charge valve to allow fluid to pass through the valve to the accumulator after which the process advances to step 1036.

At step 1036, controller sends a signal to command the pump to pump displacement and pressure based on available power so that the accumulator may be charged in the shortest period of time and advances to step 1038. At step 1038, the stored energy of the accumulator and the energy capacity of the accumulator are determined. At step 1040, the stored energy of the accumulator is compared to the energy capacity of the accumulator. If the stored energy of the accumulator is equal to the energy capacity of the accumulator, the answer to the determination question is the system charged is NO and the system returns to step 1036 to continue commanding the pump to pump displacement and pressure based on available power so that the accumulator may be charged in the shortest period of time and advances to step 1038. If the answer to the determination question is the system charged at step 1020 is YES, then the accumulator is charged and the system advances to step 1042. At step 1042, the controller closes charge valve to block fluid from passing through the valve to the accumulator after which the process advances to step 1044. At step 1044, the controller closes recirculation valve. If the charging occurred with the fan off, the controller will set the valve to allow fluid to pass through the valve to the fan motor. If the charging occurred with the fan on, the controller will leave the valve in the fluid-pass position. After closing recirculation valve, the process advances to step 1046 where the controller commands the pump to circulate fluid through the electro-hydraulic charging system in accordance with a cooling algorithm (not shown). Illustratively, the algorithm executed by the controller will command the pump to circulate hydraulic fluid sufficient to operate the fan at a speed required to maintain cooling. After commanding the pump, the process advances to step 1018 where the stored energy of the accumulator and the energy capacity of the accumulator are determined as previously discussed, and the process flow advances to step 1020 where a determination is made as to whether the system needs to be charged as also discussed. Depending on whether the system needs to be charged, the process advances through the charging loop starting with step 1022 et seq. if the accumulator needs to be charged, and if the accumulator does not need to be charged, than the process returns to step 1010 to start the process over by sampling another comparison of power output demand to rating of the engine.

If at step 1022 where the process determines whether the accumulator system is a decoupled system of the kind shown in FIGS. 2 and 4 or a parallel system of the kind shown in FIGS. 5 and 6, the answer to the question is the system is PARALLEL, then the accumulator advances to step 1050. At step 1050, the calculated time to recharge the accumulator is compared to 3 seconds. Although 3 seconds is used in this embodiment this period of time may be about 3 seconds, or a period of time that the fan may be off and still allow for the cooling requirements of the engine to still be satisfied, or any of the other periods of time previously described. If the calculated time to recharge the accumulator is greater than 3 seconds, that is to say, the answer to the question is recharge time greater than 3 seconds is YES, then the process advances to step 1053. If the calculated time to recharge the accumulator is less than or equal to 3 seconds, that is to say, the answer to the question is recharge time greater than 3 seconds is NO, then the process advances to step 1051

If the process advances to step 1051, step 1051 and subsequent steps 1052, 1053, 1054, 1056, 1058, 1060, 1062, 1064, and 1066, are identical to step 1031 and subsequent steps 1032, 1033, 1034, 1036, 1038, 1040, 1042, 1044, and 1046, respectively, except that the steps beginning with step 1051 occur in the flow path of a parallel system as determined by step 1022 unlike the steps beginning with step 1031 which occur in the flow path of a decoupled step determined by step 1022. Because these mirror steps in decoupled and parallel system path are the same, the discussion of the steps beginning with step 1031 and subsequent steps 1032, 1033, 1034, 1036, 1038, 1040, 1042, 1044, and 1046 are applicable to the counterpart steps beginning with step 1051, and subsequent steps 1052, 1053, 1054, 1056, 1058, 1060, 1062, 1064, and 1066, and so will not be repeated.

If, at step 1050, the calculated time to recharge the accumulator is greater than 3 seconds, that is to say, the answer to the question is recharge time greater than 3 seconds is YES, then the process advances to step 1053. At step 1053, controller 350 enables electro-hydraulic charging system to charge accumulator with the fan on and the process advances to step 1054 where the controller opens a charge valve to allow fluid to pass through the valve to the accumulator. At step 1076, controller sends a signal to command the pump to displacement and pressure based on maximum power so that the accumulator may be charged in the shortest period of time and advances to step 1077. At step 1077, the controller applies a signal to motor to adjust the displacement in accordance with a cooling algorithm (not shown). The adjustment is an increase or decrease in displacement to maintain the torque in order to keep the fan operating at a desired speed, and may advance directly to step 1078 where the speed of the fan speed is measured by sensors previously discussed and then to step 1079 where the speed of the fan is compared to a predetermined fan speed. If the speed of the fan is not equal to the predetermined fan speed, the answer to the determination question is the fan at desired speed is NO and the system returns to step 1077 to continue commanding the motor to make further displacements according to an algorithm (not shown) so that the accumulator may be charged in the shortest period of time and advances to step 1080. If the answer to the determination question is the fan at desired speed is YES, then the system advances to step 1080 where the stored energy of the accumulator is compared to the energy capacity of the accumulator. If the stored energy of the accumulator is equal to the energy capacity of the accumulator, the answer to the determination question is the system charged is NO and the system returns to step 1076 to continue commanding the pump to displacement and pressure based on available power so that the accumulator may be charged in the shortest period of time and advances to step 1077. If the answer to the determination question is the system charged at step 1080 is YES, then the accumulator is charged and the system advances to step 1082.

At step 1082, the controller closes charge valve to block fluid from passing through the valve to the accumulator after which the process advances to step 1086. At step 1086, the controller commands the pump and motor in accordance with an algorithm (not shown). After commanding the pump, the process advances to step 1018 where the stored energy of the accumulator and the energy capacity of the accumulator are determined as previously discussed, and the process flow advances to step 1020 where a determination is made as to whether the system needs to be charged as also discussed. Depending on whether the system needs to be charged, the process advances through the charging loop starting with step 1022 et seq. if the accumulator needs to be charged, and if the accumulator does not need to be charged, then the process returns to step 1010 to start the process over by sampling another comparison of power output demand to rating of the engine.

The disclosed control system for charging an electro-hydraulic system may be relatively inexpensive and provides a novel energy-savings mode of operation. By toggling the position of the fan isolation valve a greater flow may be delivered to the accumulator for charging. The valve is toggled from the flow-passing position, where the flow is driving fan motor 18, 322 thereby maintaining fan 20 in an on position, to the flow-blocking position. In this position, the flow is inhibited from driving fan motor 18, 322 thereby causing the fan to turn off, when the time to charge an accumulator is less than the period of time that the fan may be off while still allowing for the cooling requirements of the engine to be satisfied. This allows a greater flow to be delivered to the accumulator for charging, making it possible to charge the accumulators quicker and more efficiently while maintaining the cooling requirements of the engine.

It will be apparent to those skilled in the art that various modifications and variations can be made to the disclosed electro-hydraulic charging system. For example, although the disclosed pumps and motors are described as being variable and fixed displacement or variable and variable displacement type devices, respectively, it is contemplated that the disclosed pumps and motors may alternatively both be fixed displacement type devices, if desired. Other embodiments will be apparent to those skilled in the art from the consideration of the specification and practice of the disclosed electro-hydraulic system. It is intended that the specification and examples be considered as exemplary only, with a true scope being indicated by the following claims and their equivalents.

What is claimed is:

1. A control system for charging an electro-hydraulic system, the control system comprising:
- at least one sensor operatively coupled to the control system for sensing at least one parameter indicative of a charge level in an accumulator;
- a controller operatively coupled to the at least one sensor and adapted to:
  - determine a time required to charge the accumulator, and
  - charge the system with a fan in an off position when the time required to charge the accumulator is less than a predetermined time.

2. The control system of claim 1, wherein the at least one sensor is a pressure sensor, and the predetermined period of time is the period of time that the fan may be in the off position and still allow for the cooling requirements of an engine coupled to the electro-hydraulic system to be satisfied.

3. The control system of claim 1, wherein the predetermined period of time is determined by the time it takes for the fan to spin down to a point where the fan is no longer spinning.

4. The control system of claim 1, wherein the predetermined period of time is 3 seconds or about 3 seconds.

5. The control system of claim 2, wherein the system includes at least one valve having an electrically activated solenoid, the controller is adapted to control an operating state of the system by electrically activating the solenoid, and the operating state of the system includes a non-charging state and a charging state.

6. The control system of claim 5, wherein the valve blocks fluid from flowing to a fan motor when the predetermined period of time is the period of time that the fan may be in the off position and still allow for the cooling requirements of the engine coupled to the electro-hydraulic system to be satisfied.

7. The control system of claim 5, wherein the valve directs fluid to flow to the at least one accumulator to be pressurized when the system is in the charging state.

8. The control system of claim 2, wherein the electro-hydraulic system is a decoupled electro-hydraulic charging system.

9. The control system of claim 2, wherein the electro-hydraulic system is a parallel electro-hydraulic charging system.

10. The control system of claim 9, wherein the control system further comprises a fan motor sensor coupled to the system for sensing at least one parameter indicative of a displacement in a fan motor, and the control system adjusts the displacement of the fan motor in response to the at least one parameter sensed by the fan motor sensor.

11. A method for charging an electro-hydraulic system, the method comprising:
- receiving a signal indicative of a charge level in an accumulator from at least one sensor operatively coupled to the system;
- determining a time required to charge the accumulator; and charging the system with a fan in an off position when the time required to charge the accumulator is less than a predetermined time.

12. The method of claim 11, wherein the at least one sensor is a pressure sensor, and the predetermined period of time is a period of time that the fan may be in the off position and still allow for the cooling requirements of an engine coupled to the electro-hydraulic system to be satisfied.

13. The method of claim 11, wherein the predetermined period of time is determined by the time it takes for the fan to spin down to a point where the fan is no longer spinning.

14. The method of claim 11, wherein the predetermined period of time is 3 seconds or about 3 seconds.

15. The method of claim 12, wherein the system includes at least one valve having an electrically activated solenoid, the controller being adapted to control an operating state of the system by electrically activating the solenoid, and the operating state of the system includes a non-charging state and a charging state.

16. The method of claim 15, wherein the valve blocks fluid from flowing to a fan motor when the predetermined period of time is the period of time that the fan may be in the off position and still allow for the cooling requirements of the engine coupled to the electro-hydraulic system to be satisfied.

17. The method of claim 15, wherein the valve directs fluid to flow to the at least one accumulator to be pressurized when the system is in the charging state.

18. The method of claim 12, wherein the electro-hydraulic system is a decoupled electro-hydraulic charging system.

19. The method of claim 12, wherein the electro-hydraulic system is a parallel electro-hydraulic charging system.

20. The method of claim 19, wherein the control system further comprises a fan motor sensor coupled to the system for sensing at least one parameter indicative of a displacement in a fan motor, and the control system adjusts the displacement of the fan motor in response to the at least one parameter sensed by the fan motor sensor.

* * * * *